Aug. 18, 1970  R. L. CARMON  3,524,552
FILTER
Filed April 24, 1968  2 Sheets-Sheet 1
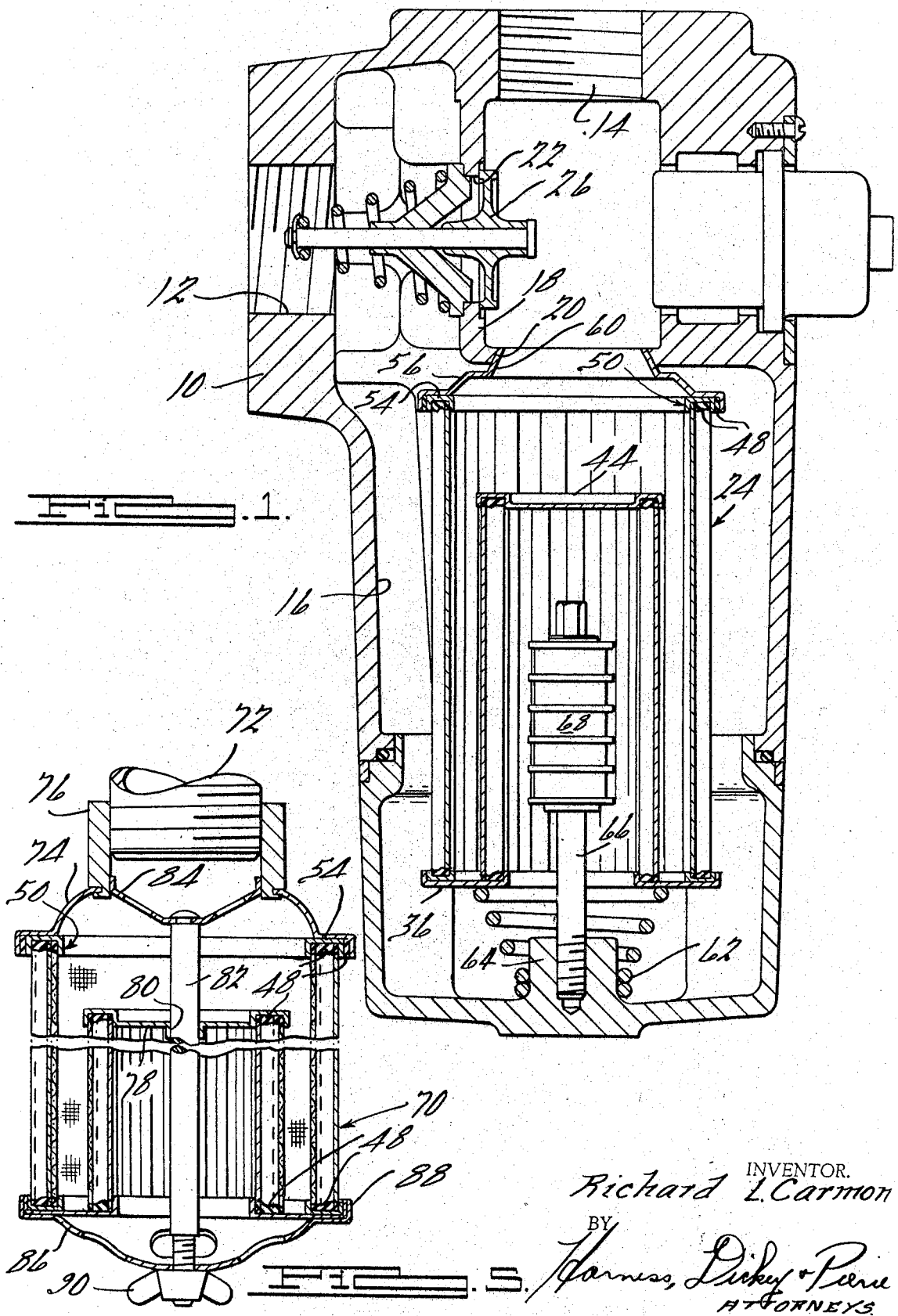
INVENTOR.
Richard L. Carmon
BY
Harness, Dickey & Pierce
ATTORNEYS

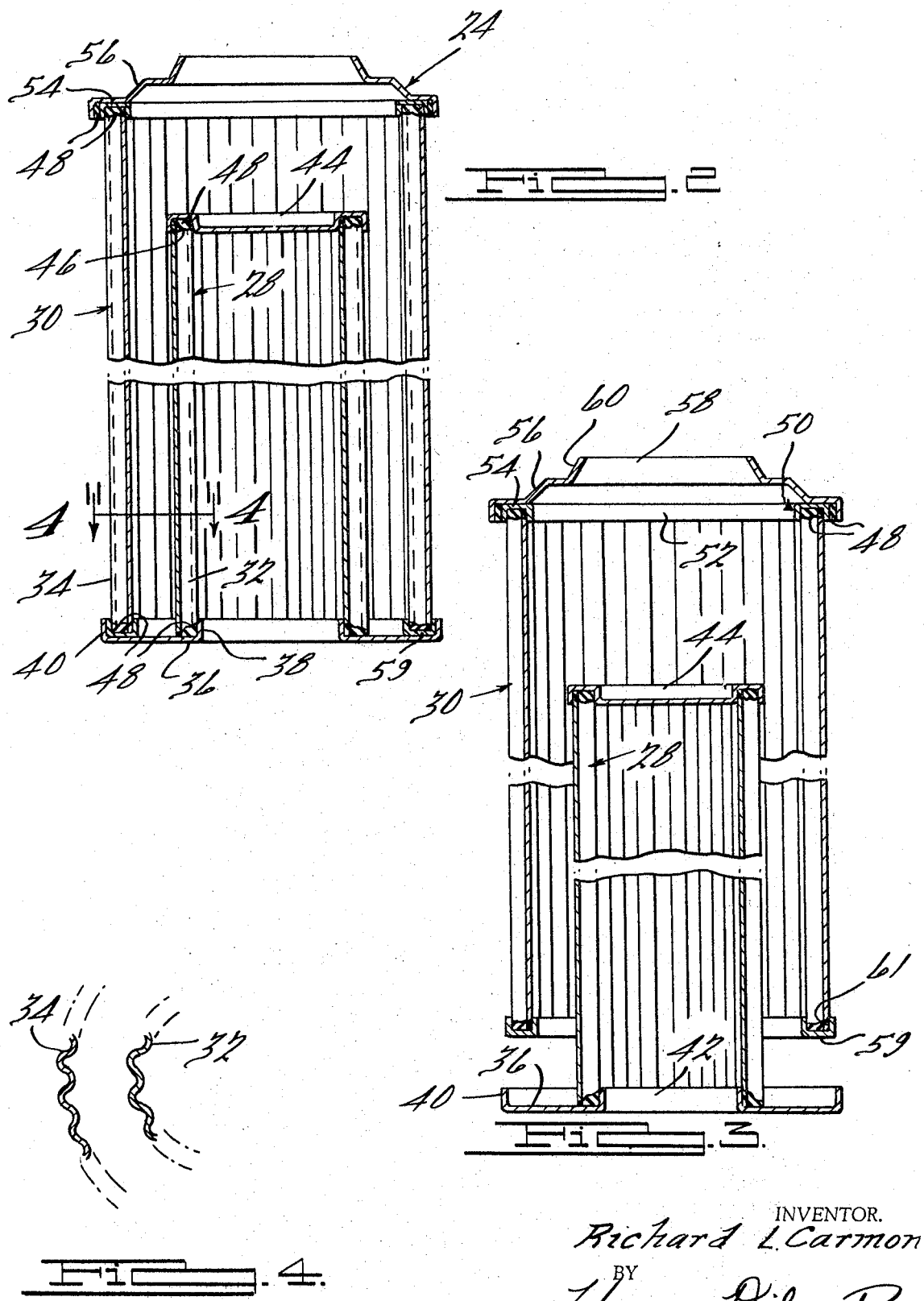

United States Patent Office 3,524,552
Patented Aug. 18, 1970

1

3,524,552
FILTER
Richard Lyle Carmon, Birmingham, Mich., assignor, by mesne assignments, to AMBAC Industries, Inc., a corporation of New York
Continuation-in-part of application Ser. No. 586,904, Sept. 9, 1966. This application Apr. 24, 1968, Ser. No. 723,716
Int. Cl. B01d 29/26
U.S. Cl. 210—342                       5 Claims

ABSTRACT OF THE DISCLOSURE

A filter cartridge assembly of the type having two concentrically spaced annular filter elements. Fluid flows from an inlet radially inwardly through the outer element and radially outwardly through the inner element to the space between the elements. This space is closed at one end of the cartridge by an end member which is fixed to one of the filter elements and removably engages the other element. The filter elements are not directly connected at the opposite end of the cartridge, an arrangement which leaves a large, unobstructed exit for the fluid.

---

This application is a continuation-in-part of application Ser. No. 586,904, filed Sept. 9, 1966, now abandoned.

BACKGROUND AND OBJECTS OF THE INVENTION

Various filter cartridges have been proposed in which one annular filter element is positioned concentrically within another annular filter element. Such filter cartridges have presented certain problems in connection with cleaning thereof. It has been found desirable to construct the inner and outer filter elements of such a duel filter cartridge in a manner which will permit the disassembly of the two elements for cleaning. It is, therefore, an object of the present invention to provide a filter cartridge assembly of the dual concentric filter element type which can be disassembled for cleaning in which the pressure drop across the cartridge is minimized, in which the unit is properly sealed against leakage of unfiltered fluid, and in which the proper spacing of the two filter elements is assured.

It is another object of the present invention to present a filter cartridge of the above type which is inexpensive of manufacture and rugged in construction.

SUMMARY OF THE INVENTION

The foregoing objects are achieved by the utilization of a filter cartridge comprising two concentric filter elements of generally annular configuration in which the inner filter element has an end member permanently affixed to one end thereof and which extends radially outwardly to removably engage and locate the outer filter element. This end member closes the space between the filter elements at one end of the filter cartridge. The two filter elements are unconnected at the opposite end of the filter cartridge to minimize obstructions to the flow of fluid escaping to the outlet. A spring or other means biases the end member against the outer element to hold the two elements together and to hold the cartridge in place.

DESCRIPTION OF THE DRAWINGS

FIG. 1 is a sectional view of a filter employing the filter cartridge of the present invention;

FIG. 2 is a sectional view of the filter cartridge of FIG. 1;

FIG. 3 is an exploded view of the parts illustrated in FIG. 2;

2

FIG. 4 is a sectional view of the structure illustrated in FIG. 2, taken along the line 4—4 thereof; and FIG. 5 is a sectional view of a filter showing a modified form of the present invention.

DETAILED DESCRIPTION OF THE PREFERRED EMBODIMENTS

Referring now to FIG. 1, there is illustrated a filter employing a housing 10 having an inlet 12 and outlet 14. The housing 10 has a chamber 16 adapted to receive fluid from the inlet 12. A wall 18 is interposed between the outlet 14 on the one hand and the inlet 12 and chamber 16 on the other hand. The wall 18 has a pair of openings 20 and 22 to which are fitted a filter cartridge 24 and a pressure relief valve 26, respectively. The pressure relief valve 26 will open when the filter cartridge 24 becomes so clogged that an excessive pressure drop developes between the inlet and the outlet.

The filter cartridge 24 includes an inner filter element 28 and an outer filter element 30. The filtering media of said elements include corrugated annular porous walls 32 and 34 made from woven wire mesh or the like. The wall 32 of the inner filter element 28 is permanently secured at its lower end to an end member or cap 36, which is of annular configuration and is provided with upstanding annular concentric flanges 38 and 40. The inner flange 38 defines a central opening 42 for the flow of unfiltered liquid upwardly into the center area of the inner filter element 28. The inner filter cartridge wall 32 is seated between the flanges 38 and 40 so as to engage the flange 38 at one end of its inner periphery. The opposite end of the wall 32 is fitted with an upper end member or cap 44 having an annular groove 46 in which the upper end of the wall 32 is seated. The opposite ends of the wall 32 are fixed to the caps 36 and 44 by means of a bonding agent 48 which may consist of an epoxy resin.

The wall 34 is fitted at its upper end with an annular end member or cap 50 having a large central opening 52 and an annular groove 54. The end member 50 is secured to a header or locating member 56 having a central opening 58 defined by an annular conical seat 60. The member 50 is secured to the cap 56 by means of the bonding material 48. The opposite or lower end of the wall 34 is fitted with an end member or cap 48 having an annular groove 54. The wall 34 is locked in the grooves 54 and 51 by the bonding material 48.

The outer filter element 30 has an inner peripheral diameter greater than the outer diameter of the element 30 so that an annular spacing exists between the walls 32 and 34. It will also be seen that the end member 49 of the outer wall 34 seats flatly against the header 36 in a position in which it engages the inner side of the flange 40. By this means the upward flow of unfiltered fluid to the spacing between the walls 32 and 34 is prevented and relative radial or lateral shifting of the elements 28 and 30 is prevented. The inner element 28 is shorter than the outer element 30 and there is no direct connection between the end members 44 and 50 or other portions of the elements 28 and 30 at the upper ends thereof. Accordingly, a large unobstructed path for the flow of fluid from the space between the walls 32 and 34 to the outlet 14 is provided.

The flow of fluid through the housing 10 occurs in the following manner. Fluid flows downwardly from the inlet 12 into the chamber 16 and then either radially inwardly through the wall 34 or upwardly through the opening 42 to the space within the inner filter element 28 and thence radially outwardly. This fluid is free to flow either radially inwardly through the outer filter element wall 34 or radially outwardly through the inner filter element wall 32 to the spacing between the walls 32 and 34. Fluid flows upwardly from this space through the opening 58 of the cap 56 and to the outlet 14. Should the pores of the walls 32 and 34 become sufficiently clogged, producing an excess pressure drop between the inlet 12 and the outlet 14, the bypass valve 26 will open to bypass unfiltered fluid directly from the inlet to the outlet. The filter cartridge is normally changed prior to this happening, however.

FIG. 1 illustrates the manner in which the filter cartridge 24 is supported and located within the housing 10 The seat 60 is fitted within the opening 20 of the wall 18. This locates the one end of the filter element and seals the header to the wall 18. The filter cartridge 24 is held in this position by means of a coil spring 62 which surrounds a boss 64 at the lower end of the chamber 16. The spring 62 presses against the lower side of the member 36. In so doing, it applies an upward force to the inner filter element 28. This force is transmitted through the member 36 to the outer filter element 30. By this means, the entire filter cartridge 24 is not only held in place but the two filter elements 28 and 30 are also held together. It will be seen that the arrangement permits a shaft 66 to be threaded into the boss 64 in order to support a magnetized body 68 which will collect ferrous particles present in the fluid passing close to it.

In order to disassemble the cartridge 24 for cleaning it is only necessary to separate the several parts of the housing 10 in order to remove the filter cartridge 24. At this point the two filter elements 28 and 30 are pulled apart with an axial separating force, generally as shown in FIG. 3. The disassembly of the two filter elements 28 and 30 considerably enhances the ability of maintenance personnel to clean the unit and restore it to use in a near new condition.

A somewhat modified form of the present invention is illustrated in FIG. 5, wherein a filter cartridge 70 is shown as being connected to the lower end of a sump collecting tube 72. The filter cartridge 70 is provided with a cap or header 74 having a threaded sleeve 76 threaded on to the tube 72. The cap 76 forms a permanent part of the outer filter element portion of the cartridge 70 and is comparable in function to the member 56 of the prior embodiment. The inner filter element portion of the cartridge 70 is provided with an end member 78 at its upper end which has a central opening 80 closely and sealingly engaging a threaded rod 82 suspended from the sleeve 76 through a perforated metal clip 84. The rod 82 extends down centrally through the filter cartridge 70 and is fitted at its lower end with a retainer 86 having a flange 88 closely confining the outer periphery of the cartridge 70 at its lower end. Outward force is applied through the retainer 86 to the filter cartridge 70 by means of a wing nut 90. In all other respects the filter cartridge 70 is similar to the filter cartridge 24 and may be disassmbled in the same manner. The cartridge 70, however, is particularly adapted to be suspended within a fluid reservoir, sump, or the like, and does not require confinement within a particularly shaped housing. Fluid is drawn upwardly through the tube 72 by a suitable pump and liquid is free to flow radially through the inner and outer walls of the cartridge 70 in the manner previously described for the cartridge 24.

In both embodiments of the invention illustrated herein, the inner filter element is provided with an upper end member which will seal the space within the inner filter element at its upper end and with a lower end member which projects radially outwardly therefrom and is held against the lower end of an outer filter element by suitable retaining means. Accordingly, the two elements are held in assembly and the spacing between the two is properly established at the lower end of the cartridge without any direct connection between the upper ends of the two filter elements. Accordingly, the inner filter element may be made of a lesser height than the other filter element and the flow of fluid from the space between the two filter elements to the outlet can be left unrestricted by anything directly connecting the upper ends of the two filter elements. This has been found to produce a substantial advantage in reducing the pressure drop across the cartridge, which is an important consideration.

The various end members illustrated are desirably made from sheet metal and are impervious except where openings are shown. The several filtering media walls are conveniently bonded to said end members by the use of epoxy resin. Of course, other adhesive may also be used. Gaskets may be used at the various sealing surfaces, although adequate sealing has been found to result from the metal-to-metal contact which is illustrated.

While the preferred embodiments of the invention illustrated herein are well calculated to fulfill the objects above stated, it will be apparent that the invention is susceptible of modification, variation and change without departing from the fair means or scope of the subjoined claims.

What is claimed is:

1. A filter cartridge assemby including concentric inner and outer filter elements having radially opposed concentric filtering walls, means for axially removing said inner filter element independently of said outer filter element including said inner filter element having a first end member permanently secured at one end thereof and projecting radially outwardly therefrom to form a support flange, a second end member operable to close the space within said inner filter element at the opposite end thereof, said outer filter element having an end portion sealingly but removably fitted against said support flange of said first end member and radially located thereby, said filter elements being unconnected at the ends thereof adjacent said second end members to provide a substantially unobstructed flow path to and from both inner and outer filter elements and means operable to resiliently bias said support flange of said first end member against said outer element end portion and said latter end portion constructed to be releasable to permit removal of said inner filter element independently of said outer filter element, said first end member having a cylindrical flange in which said outer filter element is closely fitted.

2. The structure set forth in claim 1 wherein said inner filter element is shorter than said outer filter element, whereby the space within said outer filter element at the end thereof opposite its said end portion is entirely open.

3. The structure set forth in claim 1 wherein said biasing means comprises a spring;

4. The structure set forth in claim 1 wherein said biasing means comprises a perforated retainer, a rod passing centrally through said inner filter element and a fastener on one end of said rod.

5. The structure set forth in claim 1 including a header secured to the end of said outer filter element opposite said end portion, said header having a central opening and supporting means engaging said header.

References Cited

UNITED STATES PATENTS

| 2,792,118 | 5/1957 | Kraissi | 210—315 X |
| 2,883,056 | 4/1959 | Muller | 210—493 |
| 2,998,138 | 8/1961 | Mould et al. | 210—315 X |
| 3,211,292 | 10/1965 | Bull | 210—342 |
| 3,361,260 | 1/1968 | Buckman | 210—342 X |
| 3,420,377 | 1/1969 | Vandersip | 210—342 X |

REUBEN FRIEDMAN, Primary Examiner

T. A. GRANGER, Assistant Examiner

U.S. Cl. X.R.

210—444